(12) United States Patent
Okumura

(10) Patent No.: US 7,126,657 B2
(45) Date of Patent: Oct. 24, 2006

(54) MULTI-DOMAIN TRANSFLECTIVE LIQUID CRYSTAL DISPLAY WITH PLURALITY OF BAND-SHAPED REFLECTORS

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 17 days.

(21) Appl. No.: 10/778,573

(22) Filed: Feb. 17, 2004

(65) Prior Publication Data

US 2004/0227876 A1 Nov. 18, 2004

(30) Foreign Application Priority Data

Mar. 13, 2003 (JP) .............................. 2003-068340

(51) Int. Cl.
*G02F 1/1335* (2006.01)
(52) U.S. Cl. ..................... 349/114; 349/113; 349/129
(58) Field of Classification Search ................ 349/143, 349/113–114, 129
See application file for complete search history.

(56) References Cited

U.S. PATENT DOCUMENTS

| 6,525,797 | B1 * | 2/2003 | Tsuda et al. ................. 349/139 |
| 6,788,375 | B1 | 9/2004 | Ogishima et al. |
| 6,879,361 | B1 * | 4/2005 | Moon et al. ................. 349/114 |
| 2002/0149728 | A1 * | 10/2002 | Ogishima et al. ........... 349/129 |
| 2004/0165129 | A1 * | 8/2004 | Okumura et al. ........... 349/114 |
| 2005/0001947 | A1 | 1/2005 | Ogishima et al. |

FOREIGN PATENT DOCUMENTS

| CN | 1385738 A | 12/2002 |
| JP | A 11-242225 | 9/1999 |
| JP | A 11-242226 | 9/1999 |
| JP | A-2000-019563 | 1/2000 |
| JP | A 2002-350853 | 12/2002 |
| JP | A-2003-005211 | 1/2003 |
| JP | A-2003-167253 | 6/2003 |
| JP | A-2004-069767 | 3/2004 |
| JP | A-2004-279565 | 10/2004 |
| KR | A-2002-0079583 | 10/2002 |

OTHER PUBLICATIONS

Jisaki, Makoto et al. "Development of transflective LCD for high contrast and wide viewing angle by using homeotropic alignment." *Asia Display/IDW '01*, pp. 133-136 (2001).

* cited by examiner

*Primary Examiner*—Dung T. Nguyen
*Assistant Examiner*—Phu Vu
(74) *Attorney, Agent, or Firm*—Oliff & Berridge, PLC

(57) ABSTRACT

The invention provides a liquid crystal display device capable of realizing a display, which has a high brightness and a wide viewing angle in both transmissive display and reflective display. A liquid crystal display device according to the present invention includes a transmissive display region and a reflective display region, and also is formed of liquid crystal with a negative dielectric anisotropy such that an initial alignment state is vertical. Electrodes to drive the liquid crystal are provided with slit-shaped openings and convex portions to regulate the alignment of liquid crystal molecules, and an insulating film to allow the thickness of the liquid crystal layer in the transmissive display region to be larger than the thickness of the liquid crystal layer in the reflective display region is formed between a substrate and the liquid crystal layer. The insulating film has an inclined plane to continuously vary its layer thickness in the vicinity of the boundary of the transmissive display region and the reflective display region, and a longitudinal direction of the inclined plane intersect a longitudinal direction of the openings and/or the convex portions, as viewed in plan view.

8 Claims, 7 Drawing Sheets

F I G. 1
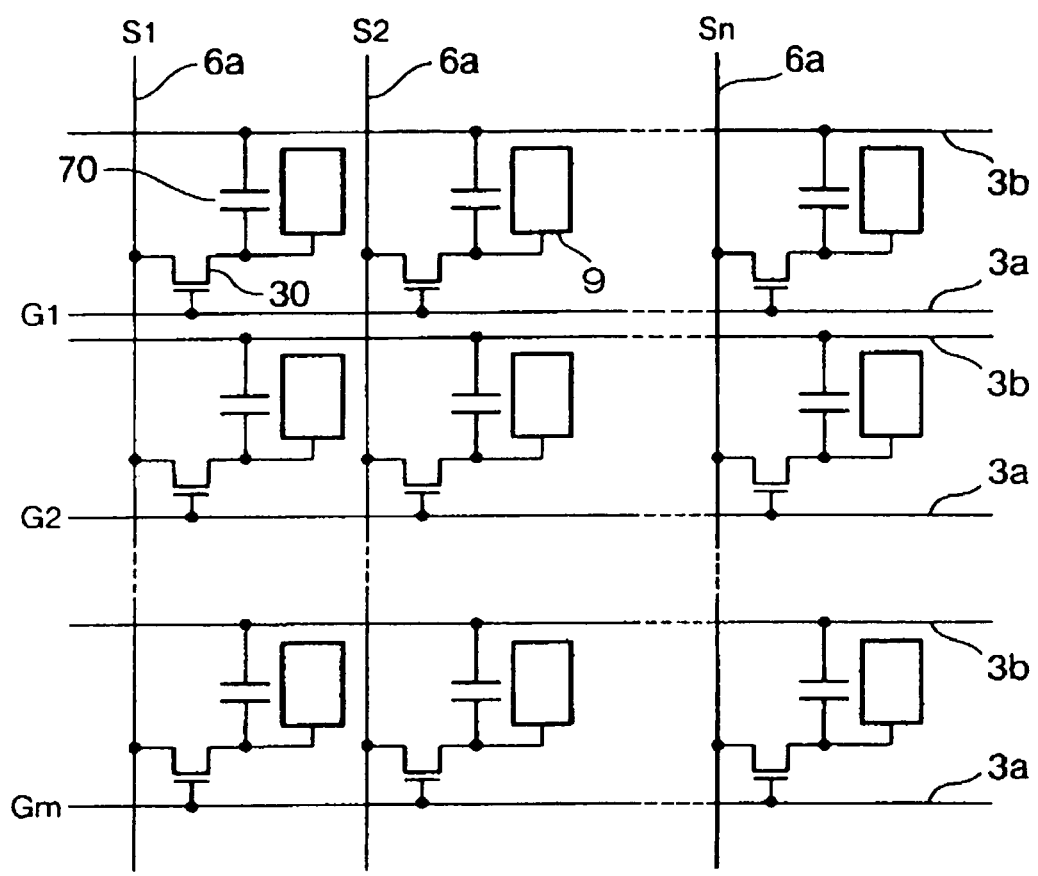

F I G. 2
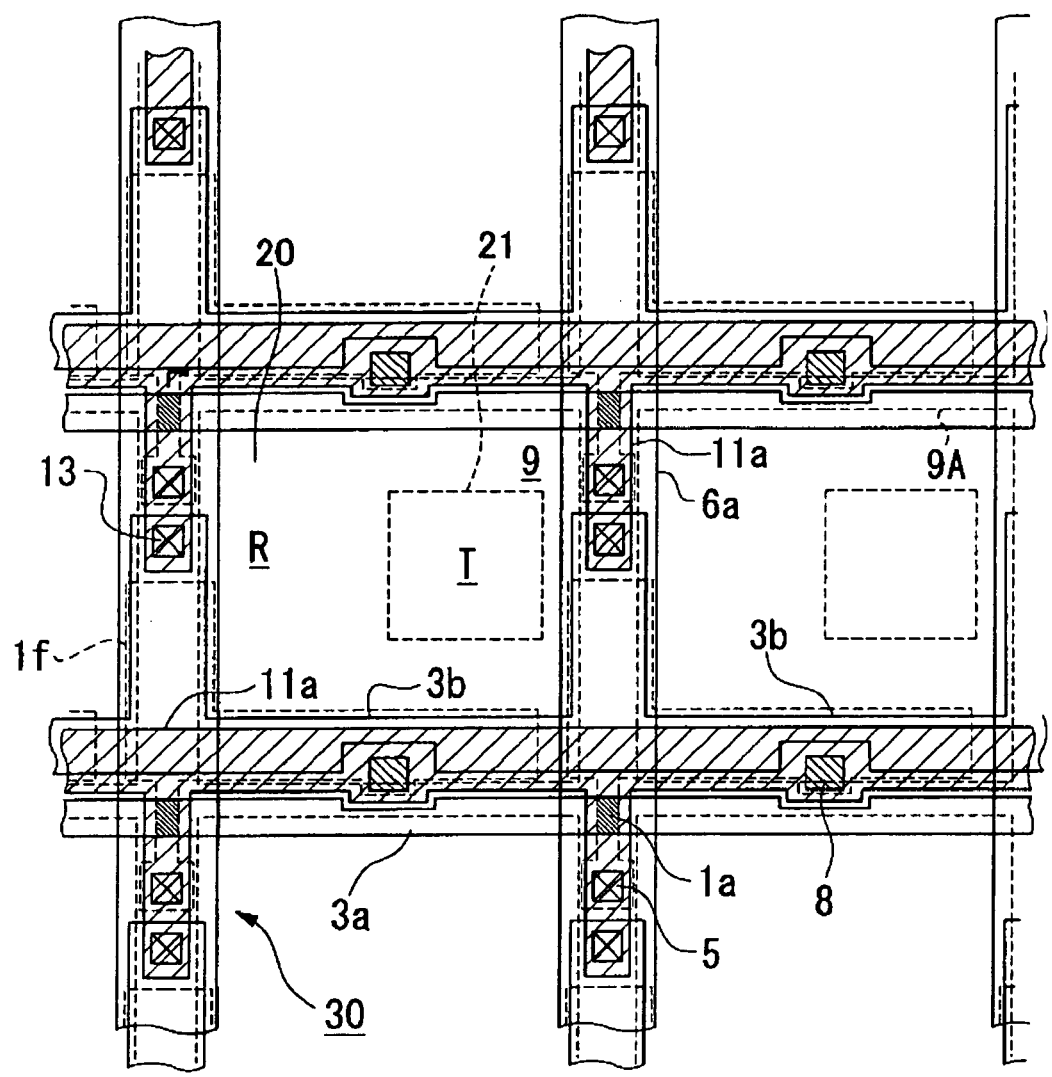

MULTI-DOMAIN TRANSFLECTIVE LIQUID CRYSTAL DISPLAY WITH PLURALITY OF BAND-SHAPED REFLECTORS

BACKGROUND OF THE INVENTION

1. Field of Invention

The present invention relates to a liquid crystal display device and an electronic apparatus. More specifically, the invention relates to obtaining a display having a high contrast and a wide viewing angle in a transflective liquid crystal display device in which display is performed in both a reflective mode and a transmissive mode.

2. Description of Related Art

A related art liquid crystal display device includes a transflective liquid crystal display device that provides a display that is visible using external light, similarly to a reflective liquid crystal display device, in a bright place. The transflective liquid crystal display device also provides a display that uses a backlight, similarly to the transmissive liquid crystal display device, in a dark place. Such a related art transflective liquid crystal display device includes a liquid crystal display device in which a liquid crystal layer is interposed between an upper substrate and a lower substrate, a reflective film obtained by forming windows to transmit light in a metal film made of, for example, aluminum is provided on the inner face of a lower substrate, and the reflective film is then allowed to serve as a transflective plate. In this case, in the reflective mode, the external light incident from the upper substrate side passes through the liquid crystal layer, is reflected by the reflective film at the inner surface of the lower substrate, passes through the liquid crystal layer again, and is emitted from the upper substrate side, thereby contributing to the display. On the other hand, in the transmissive mode, light from a backlight incident from the lower substrate side passes through the liquid crystal layer from the windows of the reflective film and is emitted from the upper substrate side to the outside, thereby contributing to the display. Therefore, the area in which the windows are formed in an area in which the reflective film is formed become the transmissive display region, and the areas other than transmissive display region become the reflective display region.

However, the related art transflective liquid crystal display device is subject to a problem in that the viewing angle in the transmissive display is narrow. This is because a transflective plate is provided at an inner surface of a liquid crystal cell so as not to generate parallaxes, and thus there is a restriction that the reflective display should be performed using only one polarizer provided on the observer side. Therefore, the degree of freedom in the optical design is small. Therefore, in order to address or solve the above problem, a related art liquid crystal display device uses a vertically aligned liquid crystal, which is disclosed in "Development of transflective LCD for high contrast and wide viewing angle by using homeotropic alignment", M. Jisaki et al., Asia Display/IDW'01, pp. 133–136 (2001), (hereinafter "Jisaki et al.). Three features thereof are as follows:

(1) A "VA (Vertical Alignment) mode" is employed in which a liquid crystal with a negative dielectric anisotropy is aligned vertically at the substrate, and then it falls down by applying a voltage.

(2) A "multi-gap structure" is employed in which the thicknesses of the liquid crystal layer in the transmissive display region and the reflective display region are different from each other (for this feature, see, for example, Japanese Unexamined Patent Application Publication No. 11-242226.

(3) The transmissive display regions are formed as regular octagons, and protrusions are provided at the centers of the transmissive display region on the counter substrate such that the liquid crystal molecules fall down in eight directions in those areas. That is, a so-called "alignment division structure" is employed.

SUMMARY OF THE INVENTION

The multi-gap structure as disclosed in Japanese Unexamined Patent Application Publication No. 11-242226 is useful to adjust the electro-optical characteristics (transmissivity-voltage characteristic and reflectivity-voltage characteristic) in the transmissive display region and the reflective display region. This is because light passes through the liquid crystal layer only one time in the transmissive display region, while light passes through the liquid crystal layer twice in the reflective display region.

On the other hand, the alignment division method employed by Jisaki et al. is an elegant technique using protrusions and step difference of a multi gap. However, this method has two serious problems. One problem is that if the distance between protrusions provided at the centers of the transmissive display regions and stepped portions of a multi gap is a predetermined value or more, the liquid crystal molecules do not fall down in the predetermined directions when a voltage is applied. Therefore, the octagons of the transmissive display region should be sufficiently small. The other problem is that the falling-down directions of the liquid crystal molecules in the reflective display region are not sufficiently controlled. When liquid crystal molecules fall down in disordered directions, disclinations occur at the boundary of other liquid crystal alignment areas to cause afterimages, etc. Further, since the respective alignment areas of the liquid crystal have different visual characteristics, when viewing the liquid crystal display device from an oblique direction, there may be a problem in that unevenness of displaying is observed.

The present invention addresses or solves the above, and provides, in a transflective liquid crystal display device, a liquid crystal display device capable of reducing or suppressing the occurrence of display defects such as afterimages or spot-shaped stains, in both transmissive display and reflective display, and realizing a bright display having a wide viewing angle.

In order to address or accomplish the above, the present invention provides a liquid crystal display device in which a liquid crystal layer is interposed between a pair of substrates, and a transmissive display region for transmissive display and a reflective display region for reflective display are provided in one dot region. The liquid crystal layer is formed of liquid crystal with a negative dielectric anisotropy whose initial alignment state represents is a vertical alignment, electrodes to drive the liquid crystal are formed on the pair of substrates on the liquid crystal layer side, respectively, and the electrode of at least one of the substrates is provided with slit-shaped openings formed by making a longitudinal opening in part of the electrode, and/or longitudinal convex portions made of a dielectric substance formed on the electrode, as an alignment regulating device to regulate the alignment of the liquid crystal. A thickness-adjusting layer of the liquid crystal layer to allow the thickness of the liquid crystal layer in the transmissive display region to be larger than the thickness of the liquid crystal layer in the reflective display region is formed between at least one of the pair of substrates and the liquid crystal layer, and the thickness-adjusting layer of the liquid crystal layer has an inclined plane at the vicinity of the boundary between the transmissive display region and the reflective display region so that the layer thickness thereof varies continuously. The longitudinal direction of the openings and/or the convex portions and the longitudinal direction of the inclined plane of the thickness-adjusting layer of the liquid crystal layer are arranged to intersect each other as viewed in plan view. In this case, "to intersect each other as viewed in plan view" means to intersect each other as viewed in the normal direction of the substrate Related art methods of regulating a falling-down direction of liquid crystal molecules for the vertically aligned liquid crystal molecules when a voltage is applied include, "a method by use of slits", "a method by use of protrusions", and "a method by use of stepped portions." In the "method by use of slits", elongated openings (slits) are formed in an electrode to generate a tilted electric field. In the "method by use of protrusions", convex portions having inclined planes are formed on an electrode to align some liquid crystal molecules in an oblique direction. In the "method by use of stepped portions", stepped portions are formed under an electrode to align liquid crystal molecules in an oblique direction, and to generate a tilted electric field so as to align the liquid crystal molecules in the oblique direction. The "method by use of slits" and the "method by use of protrusions" have different operations, but functions similar to each other. However, the "method by use of stepped portions" has an alignment regulating force remarkably weaker than the "method by use of slits" and the "method by use of protrusions". This is because the alignment direction of liquid crystal molecules and the direction of electric field in the stepped portions are all inclined in a direction perpendicular to the inclination of the stepped portions.

Under those circumstances, in the present invention as described above, the longitudinal direction of the inclined plane of the thickness-adjusting layer of the liquid crystal layer as the stepped portion, and the longitudinal direction of the openings (slits) and/or the convex portions (protrusions) as the alignment regulating means are arranged to intersect each other as viewed in plan view. Thus, the falling-down direction of liquid crystal molecules is almost not influenced by the inclined plane of the thickness-adjusting layer of the liquid crystal layer as the stepped portion, but regulated mainly by the openings and/or the convex portions. That is, in the present invention, the alignment regulation by the thickness-adjusting layer of the liquid crystal layer is cancelled by the alignment regulation by the openings and/or the convex portions. Thus, it is difficult to generate the defects that liquid crystal molecules fall down in disordered directions, so that the falling-down direction of liquid crystal molecules is highly regulated by the openings and/or the convex portions. As a result, it is difficult for a disclination to occur when a voltage is applied between electrodes, so that it is possible to reduce or suppress the occurrence of display defects, such as afterimages. In addition, defects such as unevenness of displaying visualized when viewing the display surface from the oblique direction hardly occur.

By allowing the longitudinal direction of the inclined plane of the thickness-adjusting layer of the liquid crystal layer and the longitudinal direction of the openings and/or the convex portions to intersect each other as viewed in plan view, the openings and/or the convex portions extending longitudinally are formed over at least the reflective display region and the transmissive display region. Therefore, it is preferable that the longitudinal direction of the openings and/or the convex portions intersects the longitudinal direction of the inclined plane of the thickness-adjusting layer of the liquid crystal layer so as to form an angle of 30° to 90° as viewed in plan view from a normal direction of the substrate. When the intersecting angle is less than 30°, the influence of alignment regulation by the inclined plane of the thickness-adjusting layer of the liquid crystal layer occurs, so that alignment failure of the liquid crystal molecules may occur in the vicinity of the intersections.

The inclined plane and the plane of the substrate may form an angle of 2° to 30°. When the angle is less than 2°, the area of the inclined plane required to adjust a thickness of the liquid crystal layer become excessively large, resulting in an decrease in transmissivity and reflectivity. On the contrary, when the angle is more than 30°, the alignment regulating force of the inclined plane to liquid crystal molecules may be increased, resulting in a negative influence on the alignment regulation of the liquid crystal molecules by the openings and/or the convex portions, and thus causing the alignment failure.

In the liquid crystal display device according to the present invention, the pair of substrates include an upper substrate and a lower substrate, a backlight for transmissive display is provided on the lower substrate opposite to the liquid crystal layer side, and a reflective film selectively formed in the reflective display region is interposed between the lower substrate and the liquid crystal layer. In this case, it is possible to more surely realize the transmissive display and the reflective display.

Further, in the present invention, since the thickness of the liquid crystal layer in the reflective display region is less than the thickness of the liquid crystal layer in the transmissive display region due to existence of the thickness-adjusting layer of the liquid crystal layer, retardation in the reflective display region and retardation in the transmissive display region can be sufficiently close to each other or can be almost equal each other, thereby accomplishing an enhancement of contrast.

Furthermore, in the present invention, the alignment regulating device has a construction to regulate a falling-down direction of the vertically aligned liquid crystal molecules in accordance with the variation in an electric field. In this case, it is possible to allow the vertically aligned liquid crystal molecules to fall down regularly in a predetermined direction. As a result, it is difficult that alignment disorder (disclination) of the liquid crystal molecules occurs, so that it is possible to avoid the display failure, such as light leakage, and to provide a liquid crystal display device having a high display property. Furthermore, when the convex portions are specifically formed as an construction for regulating the falling-down direction of liquid crystal molecules, the surfaces of the convex portions may be constructed to be inclined by a predetermined angle from the vertical alignment direction of the liquid crystal molecules.

An electronic apparatus according to the present invention includes the aforementioned liquid crystal display device. According to this electronic apparatus, display failure, such as afterimages or spot-shaped stains, can be reduced or suppressed, and it is possible to provide an electronic apparatus including a display unit, which has a high brightness and has a wide viewing angle.

BRIEF DESCRIPTION OF THE DRAWINGS

FIG. 1 is a schematic circuit diagram of a liquid crystal display device according to a first exemplary embodiment of the present invention;

FIG. 2 is a plan view illustrating the structure of dots in the liquid crystal display device according to the first exemplary embodiment of the present invention;

DETAILED DESCRIPTION OF PREFERRED EMBODIMENTS

First Exemplary Embodiment

A first exemplary embodiment of the present invention is described below with reference to the drawings.

A liquid crystal display device of this exemplary embodiment is an example of an active matrix liquid crystal display device employing thin film transistors (hereinafter "TFTs") as switching elements.

Figure 3A:
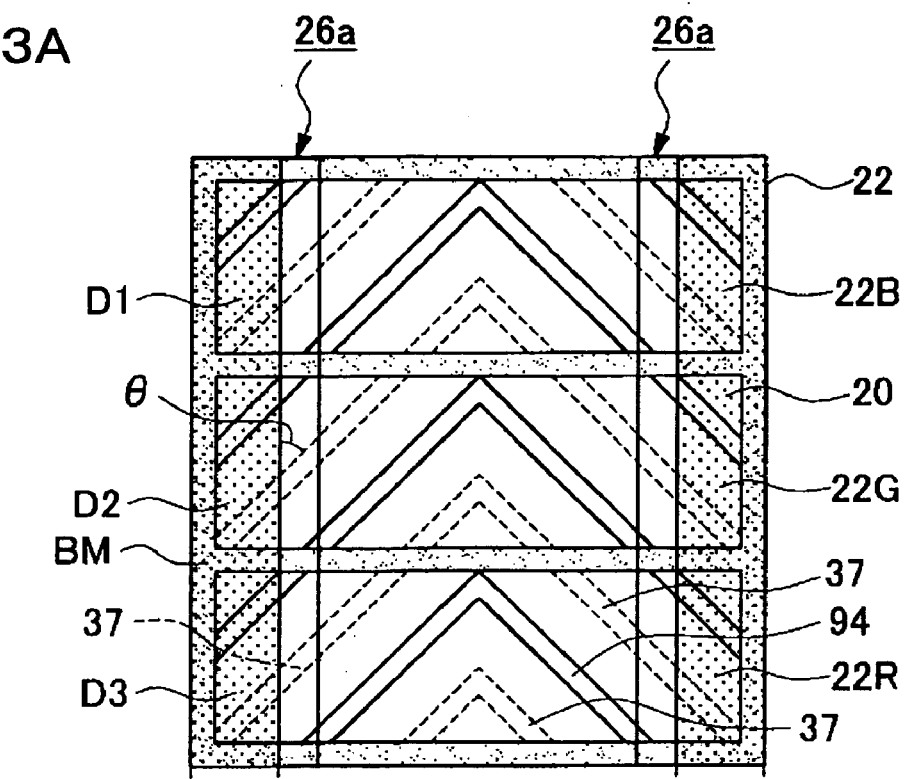
FIGS. 3A and 3B are a schematic plan view and a schematic cross-sectional view illustrating significant parts of the liquid crystal display device according to the first exemplary embodiment of the present invention.
Figure 3B:
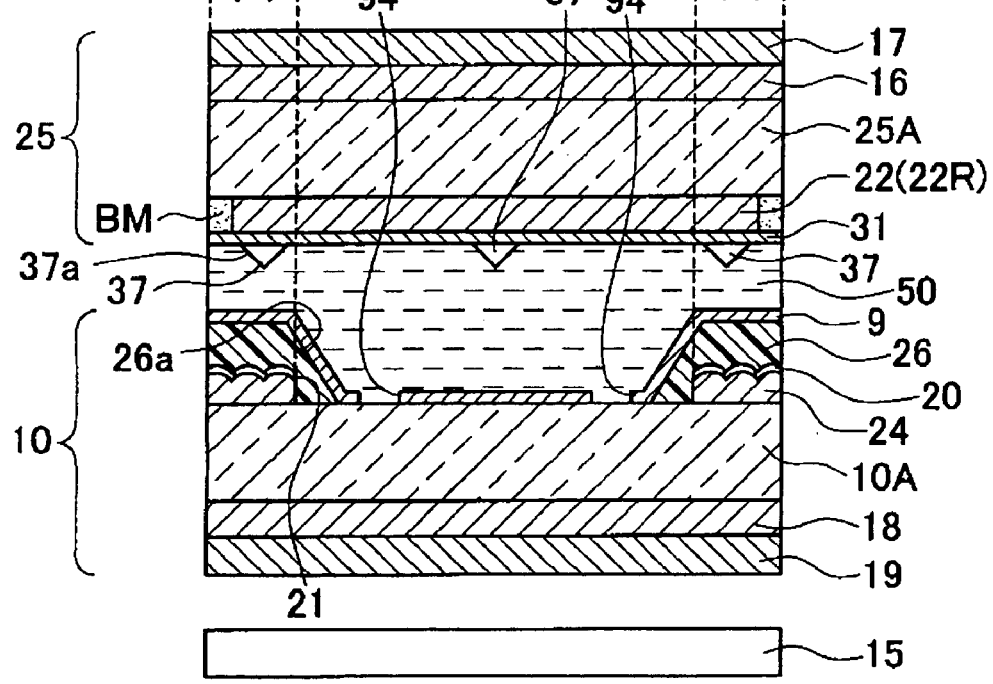

FIG. 1 is a schematic circuit diagram of a plurality of dots arranged in a matrix and constituting an image display region of the liquid crystal display device according to this embodiment, FIG. 2 is a plan view illustrating the structure of the plurality of dots adjacent to each other on a TFT array substrate, and FIGS. 3A and 3B are a schematic plan view (upper part) and a schematic cross-sectional view (lower part) illustrating the structure of the liquid crystal display device. In the following drawings, in order to make the respective layers or the respective members recognizable on the drawings, the respective layers and respective members have different scales.

As shown in FIG. 1, in the liquid crystal display device of this exemplary embodiment, pixel electrodes 9 and TFTs 30 functioning as switching elements to control the pixel electrodes 9 are respectively formed in a plurality of dots arranged in a matrix and constituting an image display region, and data lines 6a to which image signals are supplied are electrically connected to sources of the TFTs 30. Image signals S1, S2, . . . , and Sn to be written to the data lines 6a are line-sequentially supplied in that order, or are supplied to a plurality of data lines 6a adjacent to each other in units of groups. Further, scanning lines 3a are electrically connected to gates of the TFTs 30, and scanning signals G1, G2, . . . , and Gm are line-sequentially supplied in pulses to a plurality of scanning lines 3a at a predetermined timing. The pixel electrodes 9 are electrically connected to drains of the TFTs 30, and by turning on the TFTs 30 functioning as the switching elements for a certain period of time, the image signals S1, S2, . . . , and Sn supplied from the data lines 6a are written at a predetermined timing.

Predetermined levels of the image signals S1, S2, . . . , and Sn written to the liquid crystal through the pixel electrodes 9 are held between the pixel electrodes and a common electrode, which are described below, for a predetermined period of time. Since the alignment or order of molecular association varies in accordance with the voltage level applied thereto, the liquid crystal modulates light to make gray scale display possible. In order to reduce or prevent the held image signals from leaking, storage capacitors 70 are added in parallel with the liquid crystal capacitor formed between the pixel electrodes 9 and the common electrode. Reference numeral 3b denotes capacitor lines.

Referring to FIG. 2, the planar structure of the TFT array substrate constituting the liquid crystal display device according to this exemplary embodiment is described below.

As shown in FIG. 2, on the TFT array substrate, a plurality of rectangular pixel electrodes 9 (whose profiles are shown by dotted lines 9A) are provided in a matrix, and the data lines 6a, the scanning lines 3a, and the capacitor lines 3b are provided along longitudinal and transverse boundaries of the pixel electrodes 9. In this exemplary embodiment, the inside of an area in which a pixel electrode 9, the data lines 6a, the scanning lines 3a, and the capacitor lines 3b, which are arranged to surround the pixel electrode 9, are formed constitutes one dot region, and the respective dot regions arranged in a matrix can perform display.

The data lines 6a are electrically connected through contact holes 5 to source regions which constitute the TFTs 30 and are described below in a semiconductor layer 1a made of, for example, a polysilicon film, and the pixel electrodes 9 are electrically connected through contact holes 8 to drain regions, which are described below, in the semiconductor layer 1a. In addition, the scanning lines 3a are arranged to face channel regions (areas hatched in the top-left direction in the drawing) in the semiconductor layer 1a, and the portions of the scanning lines 3a facing the channel regions serve as gate electrodes.

Each capacitor line 3b has a main line portion (that is, as viewed in plan view, a first area formed along the scanning line 3a) extending along the scanning line 3a in a substantially straight line shape, and a protruding portion (that is, as seen in plan view, a second area extending along the data line 6a) protruding from a place intersecting the data line 6a toward the previous stage (upward in the drawing) along the data line 6a.

In FIG. 2, areas hatched in the top-right direction are provided with a plurality of first light shielding films 11a.

More specifically, the first light shielding films 11a are provided at positions to cover the TFTs 30 including the channel regions of the semiconductor layer 1a, as seen from the TFT array substrate side. Each of the first light shielding films has a main line portion facing the main line portion of the capacitor line 3b and extending in a straight line shape along the scanning line 3a, and a protruding portion protruding from a portion intersecting the data line 6a toward the subsequent stage (downward in the drawing) along the data line 6a. The downward protruding portion of the first light shielding film 11a at each stage (pixel row) overlaps the tip of the upward protruding portion of the capacitor line 3b at the next stage under the data line 6a. These overlapping places are provided with contact holes 13 to electrically connect the first light shielding film 11a to the capacitor line 3b. That is, in this exemplary embodiment, the first light shielding films 11a are electrically connected to the capacitor lines 3b of the previous stage or the subsequent stage through the contact holes 13.

As shown in FIG. 2, a reflective film 20 is formed at the center of each dot region. The area in which the reflective film 20 is formed becomes a reflective display region R, and the area in which the reflective film 20 is not formed, that is, the opening 21 of the reflective film 20, becomes a transmissive display region T.

Referring to FIGS. 3A and 3B, the structure of the liquid crystal display device according to this exemplary embodiment is described below.

FIG. 3A is a schematic plan view illustrating the construction of one pixel in the liquid crystal display device according to this exemplary embodiment, and FIG. 3B is a schematic cross-sectional view of a portion corresponding to a red dot in the plan view of the FIG. 3A.

The liquid crystal display device according to this exemplary embodiment has, as shown in FIG. 2, dot regions formed by providing the pixel electrode 9 inside the area surrounded by the data lines 6a, the scanning lines 3a, and the capacitor lines 3b. In the dot regions, as shown in FIG. 3A, a colored layer of one of three primary colors is provided for each dot region, and a pixel including the respective colored layers 22B (Blue), 22G (Green), and 22R (Red) is formed in three dot regions D1, D2, and D3.

On the other hand, as shown in FIG. 3B, in the liquid crystal display device according to this exemplary embodiment, a liquid crystal layer 50 made of a liquid crystal material whose initial alignment state is vertical, that is, a liquid crystal material having a negative dielectric anisotropy, is interposed between the TFT array substrate 10 and a counter substrate 25 opposite thereto. The TFT array substrate 10 has a construction in which a reflective film 20 made of a metal film having a high reflectivity such as aluminum, silver, etc., is partially formed on the surface of a substrate body 10A made of a light-transmissive material such as quartz, glass, etc., via an insulating film 24. As described above, the area in which the reflective film 20 is formed becomes the reflective display region R, and the area in which the reflective film 20 is not formed, that is, an opening 21 of the reflective film 20 becomes the transmissive display region T.

As described above, the liquid crystal display device according to this exemplary embodiment is a vertical alignment liquid crystal display device including a vertical alignment liquid crystal layer, and is also a transflective liquid crystal display device capable of performing reflective display and transmissive display. Moreover, the surface of the insulating film 24 has an uneven shape, and the surface of the reflective film 20 has an uneven portion reflecting the uneven shape of the insulating film. Since reflected light is scattered by the unevenness, external reflection is prevented, so that it is possible to obtain a display having a wide viewing angle.

Further, an insulating film 26 is formed on the substrate body 10A, and is selectively formed to cover the insulating film 24 and the reflective film 20 particularly in the reflective display region R. The insulating film 26 selectively formed in the reflective display region R has an inclined plane 26a such that the film thickness of the insulating film varies continuously in the vicinity of the boundary between the reflective display region R and the transmissive display region T. Moreover, the reflective film 20 is not formed in the area in which the inclined plane 26a is formed, and thus the area in which the inclined plane 26a is formed is included in the transmissive display region T.

The insulating film 26 is made of an organic film, such as acryl resin having a thickness of about 2 to 3 μm, the thickness of the liquid crystal layer 50 in the transmissive display region T in which the insulating film 26 is not formed is about 4 to 6 μm, and the thickness of the liquid crystal layer 50 in the reflective display region R is about a half of that of the liquid crystal layer 50 in the transmissive display region T.

In this way, in the liquid crystal display device according to this exemplary embodiment, the liquid crystal layer 50 has a smaller thickness in the reflective display region R than in the transmissive display region T, and the insulating film 26 serves as a thickness-adjusting layer of the liquid crystal layer for making the thickness of the liquid crystal layer 50 different in the reflective display region R and the transmissive display region T by its own film thickness. Due to the existence of the thickness-adjusting layer of the liquid crystal layer, the thickness of the liquid crystal layer 50 in the reflective display region R can be made smaller than the thickness of the liquid crystal layer 50 in the transmissive display region T, so that the retardation in the reflective display region R and the retardation in the transmissive display region T can be made to sufficiently approach each other or to be substantially equal to each other. As a result, it is possible to obtain a high contrast display. Moreover, an angle which the surface of the substrate body 10A and the inclined plane 26a of the insulating film 26 forms is about 2° to 30°. The insulating film 26 may be formed, for example, over the reflective display region R and the transmissive display region T. In this case, it is preferable that a relatively thick layer is formed in the reflective display region R and a relatively thin layer is formed in the transmissive display region T, with the inclined plane 26a therebetween.

The pixel electrode 9 made of a transparent conductive film, such as indium tin oxide (hereinafter "ITO") and an alignment film (not shown) made of polyimide are formed on the surface of the TFT array substrate 10 including the surface of the insulating film 26. Further, in this exemplary embodiment, the reflective film 20 and the pixel electrode 9 are separately prepared and laminated, but a reflective film made of a metal film may be used as the pixel electrode in the reflective display region R. Moreover, by giving an uneven shape to a position of the insulating film 26 functioning as the thickness-adjusting layer of the liquid crystal layer corresponding to the reflective display region R, it is also possible to give a scattering function to the reflective film 20.

On the other hand, on the counter substrate 25 side, a color filter 22 (a red colored layer 22R in FIG. 3(*b*)) is formed on a substrate body 25A (the surface of the substrate body 25A on the liquid crystal layer side) made of a light-transmissive material, such as glass or quartz. A black matrix BM surrounds the circumferential edge of a colored layer 22R, and the black matrix BM forms the boundaries of the dot regions D1, D2, and D3. Then, an overcoat layer (not shown) made of resin is formed in the color filter 22 on the liquid crystal layer side, and a common electrode 31 made of transparent conductive film, such as ITO, and an alignment film (not shown) made of polyimide, etc., are formed in the overcoat layer on the liquid crystal layer side.

The liquid crystal display device according to this exemplary embodiment includes slits 94 at a part of the pixel electrode 9. In this case, a tilted electric field is generated between the electrodes 9 and 31 in the area in which the slits 94 are formed, and thus it is possible to regulate the falling-down direction of liquid crystal molecules along the tilted electric field. Instead of forming the slits 94 in the pixel electrode 9, for example, in a case where protrusions made of resin having predetermined inclined planes are formed on the pixel electrode 9, it is also possible to regulate the falling-down direction of the liquid crystal molecules.

Further, protrusions 37 made of resin are formed on an alignment film forming surface (that is, a surface in contact with the liquid crystal layer) of the counter substrate 25. The protrusions 37 have inclined planes 37a forming a predetermined angle with respect to the substrate plane (the vertical alignment direction of liquid crystal molecules), and the alignment of the liquid crystal molecules, specifically the direction in which the vertically-aligned liquid crystal molecules fall down, is regulated along the direction of the inclined plane 37a. For example, in a case where slits are formed in the common electrode 31 instead of forming the protrusions 37 on the common electrode 31 of the counter substrate 25, it is also possible to regulate the direction in which liquid crystal molecules fall down.

Then, in the liquid crystal display device according to this exemplary embodiment, as an alignment regulating device to regulate the direction in which liquid crystal molecules fall down, the protrusions 37 and the slits 94 are arranged to intersect the inclined plane 26a of the aforementioned insulating film 26 as viewed in plan view. That is, as viewed from the normal direction of the substrate of the liquid crystal display device, the protrusions 37 and slits 94 intersect the inclined plane 26a at a predetermined angle θ.

The protrusions 37, functioning as the alignment regulating device, have predetermined inclined planes, but the maximum angle of inclination thereof is 2° to 30°. In this case, the angle of inclination indicates an angle formed by the substrate 10A and the inclined planes of the protrusions 37, and when the protrusions 37 have curved surfaces, indicates an angle formed by surface tangential to the curved surfaces and the substrate. When the maximum angle of inclination of the inclined planes is less than 2°, it may be difficult to regulate the direction in which liquid crystal molecules fall down, and when the maximum angle of inclination of the inclined planes is more than 30°, light leakage may occur in those portions, to cause defects, such as a decrease in contrast.

Next, the electrodes 9 and 31 of both the TFT array substrate 10 and the counter substrate 25 are subjected to a vertical alignment treatment. Further, a retardation film 18 and a polarizer 19 are formed on the outer surface side of the TFT array substrate 10, and a retardation film 16 and a polarizer 17 are also formed on the outer surface side of the counter substrate 25 to allow circular polarized light to enter the inner surface side of the substrates. As the structure of the polarizer 17 (19) and the retardation film 16 (18), a circular polarizer obtained by combining a polarizer and a λ/4 retardation film, or a wide-band circular polarizer obtained by combining a polarizer, a λ/2 retardation film, and a λ/4 retardation film, or a viewing angle compensating plate obtained by combining a polarizer, a λ/2 retardation film, a λ/4 retardation film, and a negative C plate (a retardation film having an optical axis in its thickness direction) can be employed. Furthermore, a backlight 15, which is the light source for transmissive display, is provided outside the polarizer 19 formed on the TFT array substrate 10.

According to the liquid crystal display device of this exemplary embodiment as described above, the slits 94 are formed in the pixel electrode 9 and the protrusions 37 are formed on the common electrode 31. Thus, the direction in which the vertically aligned liquid crystal molecules fall down is regulated by the protrusions 37 and the slits 94. Accordingly, it is difficult for disclination to occur when a voltage is applied between the electrodes 9 and 31, so that the occurrence of display defects, such as afterimages, is reduced or suppressed, and any defects where unevenness of displaying is observed when its display surface is viewed from an oblique direction hardly occur.

Figure 4:
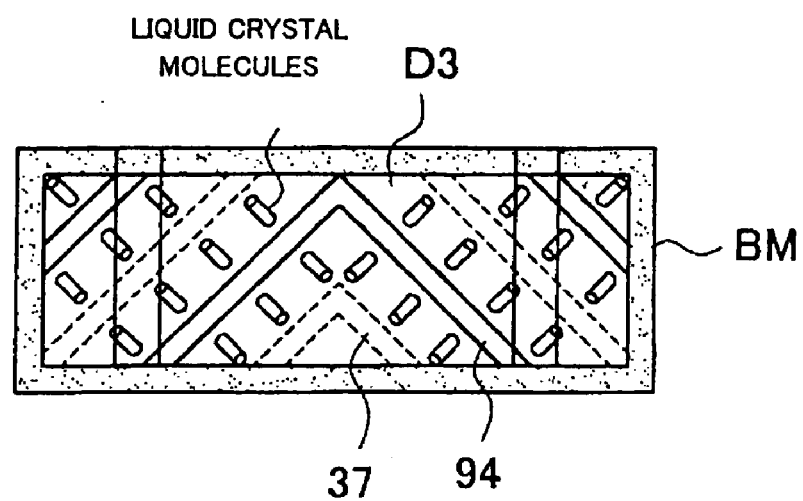
FIG. 4 is a schematic illustrating the operation of the liquid crystal display device according to the first exemplary embodiment of the present invention.

Further, since the protrusions 37 and the slits 94 intersect the inclined plane 26a as viewed in plan view, the direction in which liquid crystal molecules fall down is regulated mainly by the protrusions 37 and/or the slits 94, almost without being influenced by the inclined plane 26a. That is, since the alignment regulation by the inclined plane 26a of the insulating film 26 is very weak, it is preferable that the alignment regulation of the liquid crystal molecules is performed mainly by the protrusions 37 or the slits 94 in order to obtain satisfactory alignment regulation. However, as in this exemplary embodiment, when the protrusions 37 and the slits 94 intersect the inclined plane 26a, the alignment regulation by the inclined plane 26a is cancelled by the alignment regulation by the protrusions 37 and the slits 94, so that it is possible to satisfactorily align liquid crystal molecules along the protrusions 37 and the slits 94, as shown in FIG. 4. That is, the alignment regulating force by the inclined plane 26a is negligible as compared with the alignment regulating force by the protrusions 37 and the slits 94, so that slightly disordered alignment of liquid crystal molecules hardly occurs due to the alignment regulating force of the inclined plane 26a. As a result, in the liquid crystal display device of this exemplary embodiment, further disclination hardly occurs when a voltage is applied between the electrodes 9 and 31, so that the occurrence of display defects, such as afterimages, is reduced or suppressed, and any defects where unevenness of displaying is observed when its display surface is viewed from an oblique direction hardly occur. Therefore, it is possible to obtain a uniform display having a wide viewing angle in both the transmissive display and the reflective display.

Furthermore, specifically, it is more preferable that the inclined plane 26a intersects the protrusions 37 and/or slits 94 such that an angle θ formed by a major axis of the inclined plane 26a of the insulating film 26 and a major axis of the protrusions 37 and/or slits 94 is 30° to 90° (45° in this exemplary embodiment). This is because, when the intersection angle θ is less than 30°, the alignment regulation is influenced by the inclined plane 26a of the insulating film 26, so that alignment failure of the liquid crystal molecules may occur in the vicinity of the intersections.

Second Exemplary Embodiment

A second exemplary embodiment of the present invention is described below with reference to the figures.

Figure 5A:
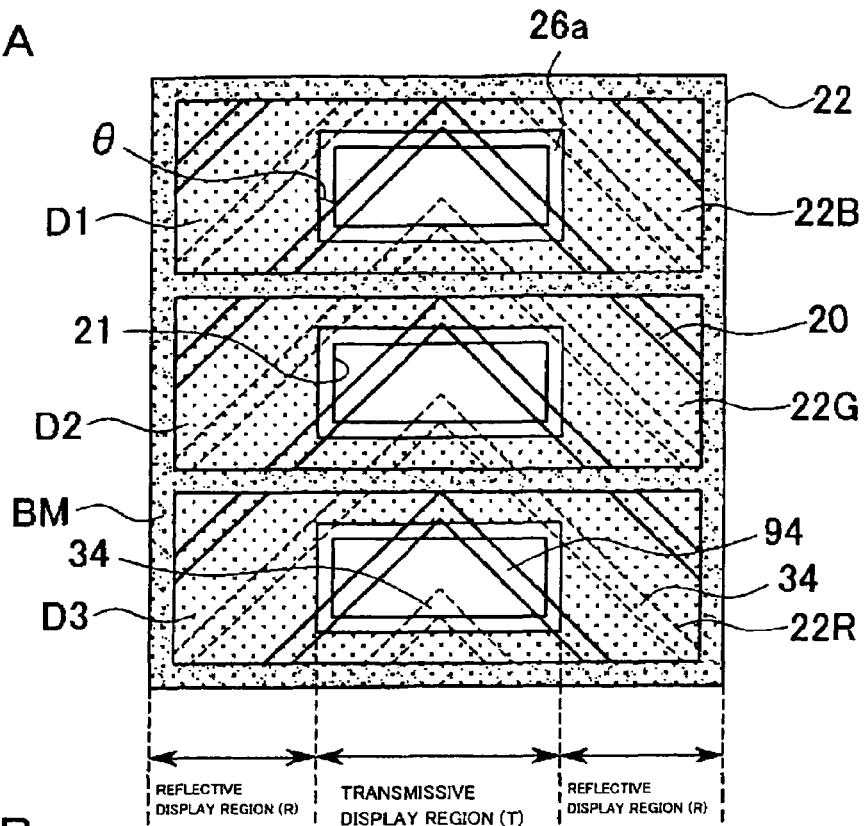
FIGS. 5A and 5B are a schematic plan view and a schematic cross-sectional view illustrating significant parts of a liquid crystal display device according to a second exemplary embodiment.
Figure 5B:
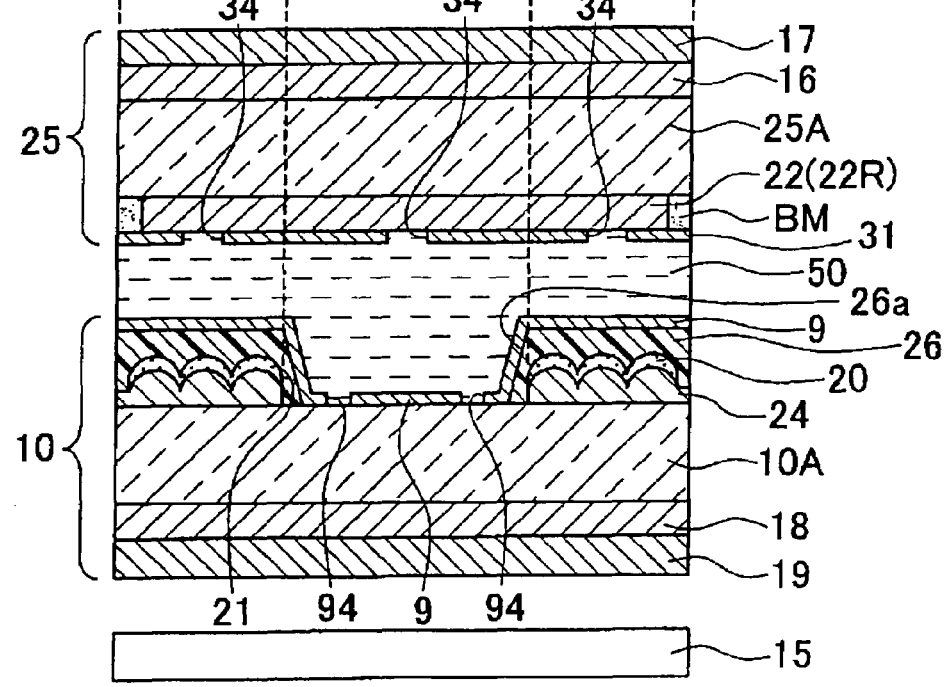

FIGS. 5A and 5B are a plan view and a cross-sectional view of a liquid crystal display device according to the second exemplary embodiment, which are schematics equivalent to FIGS. 3A and 3B of the first exemplary embodiment. A basic construction of the liquid crystal display device of this exemplary embodiment is similar to that of the first exemplary embodiment, but is largely different from that of the first embodiment in that slits 34 are formed in the common electrode 31, instead of the protrusions 37 functioning as the alignment regulating device of the counter substrate 25 side, and in an opening shape of the reflective film 20. Therefore, in FIGS. 5A and 5B elements common to those of FIGS. 3A and 3B are denoted by the same reference numerals, and a detailed description thereof is omitted.

Unlike the first exemplary embodiment, in the liquid crystal display device according to this exemplary embodiment, slits 34 are formed in the common electrode 31 of the counter substrate 25 to generate a tilted electric field between the pixel electrodes 9 and the common electrode 31, thereby carrying out the alignment regulation of liquid crystal molecules. Further, unlike the first exemplary embodiment, in order to form the transmissive display region T at centers of the dots D1, D2, and D3, the reflective film 20 is provided at circumferential edges of the dots D1, D2, and D3 in a frame shape and rectangular openings 21 are thus formed at the centers of the respective dots D1, D2, and D3. Therefore, in the liquid crystal display device according to this exemplary embodiment, the reflective display region R surrounds the transmissive display region T.

In this case, since the reflective display region R interrupts an influence from the adjacent pixels, the transmissive display is less influenced by a lateral electric field between the adjacent pixels or a mismatched assembly of the TFT array substrate 10 and the counter substrate 25, so that it is possible to obtain a high contrast in the transmissive display. On the contrary, since more slits 94 and 34 than those in the first exemplary embodiment transverse the vicinity of the boundary between the transmissive display region T and the reflective display region R, that is, the inclined plane 26a, the influence thereof on the alignment of liquid crystal molecules is concerned. However, by setting the intersection angle θ to about 45° as shown in the drawing, the alignment direction of liquid crystal molecules can be regulated without any problem.

Third Exemplary Embodiment

A third exemplary embodiment of the present invention is described below with reference to the drawings.

Figure 6A:
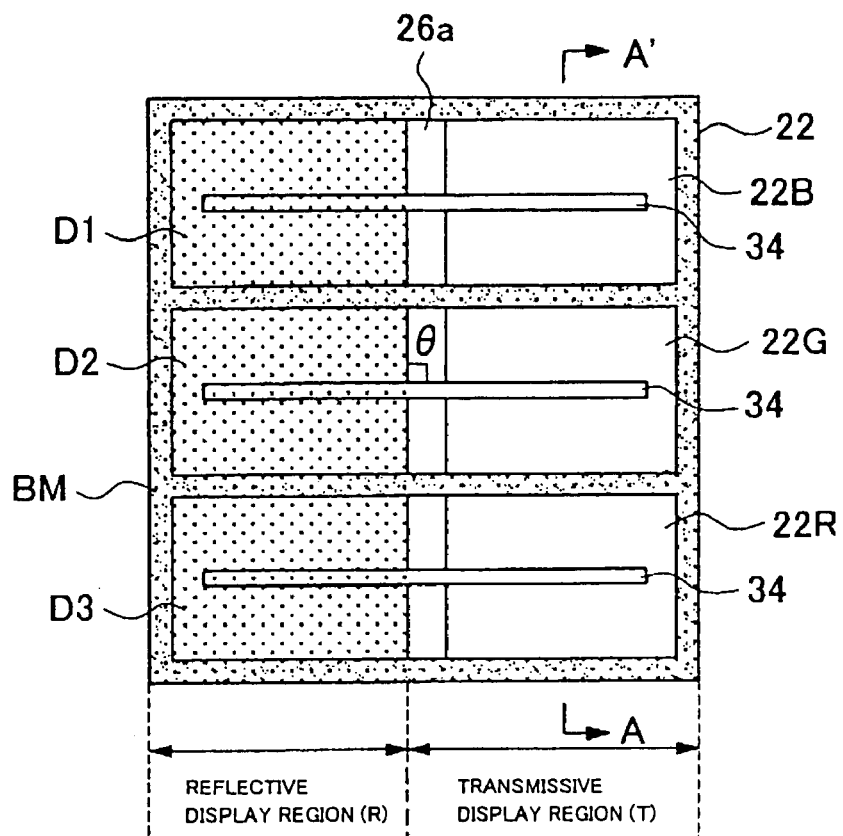
FIGS. 6A and 6B are a schematic plan view and a schematic cross-sectional view illustrating significant parts of a liquid crystal display device according to a third exemplary embodiment.
Figure 6B:
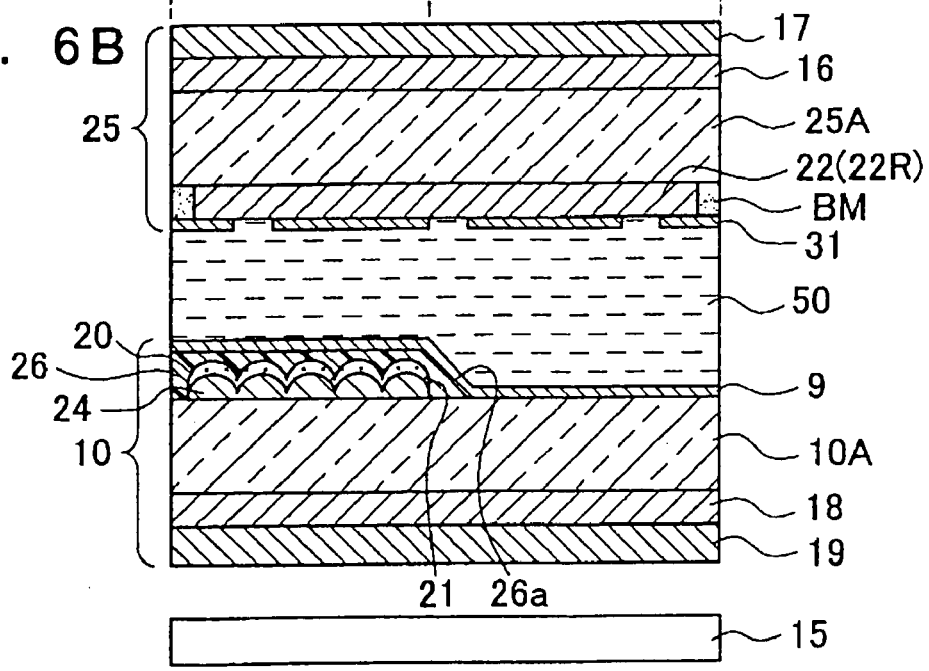
Figure 7:
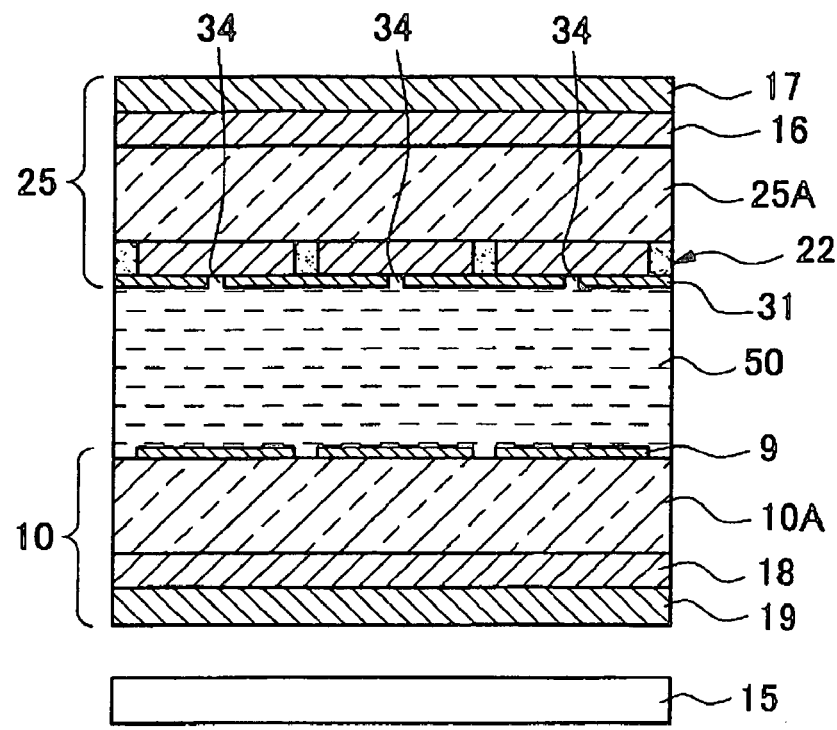
FIG. 7 is a schematic illustrating a cross-sectional view taken along plane A–A' of FIG. 6A.

FIGS. 6A and 6B are a plan view and a cross-sectional view of a liquid crystal display device according to the third exemplary embodiment, which are schematics equivalent to FIGS. 3A and 3B of the first exemplary embodiment. FIG. 7 is a schematic illustrating a cross-section taken along plane A–A' of FIG. 6A. A basic construction of the liquid crystal display device of this exemplary embodiment is similar to that of the second exemplary embodiment, but is largely different from that of the second exemplary embodiment in the arrangement of slits formed in the electrodes 9 and 31, and in an opening shape of the reflective film 20. Therefore, in FIGS. 6A, 6B and 7, elements common to those of FIGS. 5A and 5B are denoted by the same reference numerals, and a detailed description thereof is omitted.

Unlike the second exemplary embodiment, in the liquid crystal display device according to this exemplary embodiment, slits 34 formed in the common electrode 31 of the counter substrate 25 are designed to form the intersection angle θ of about 90° with the inclined plane 26a. Further, in the pixel electrode 9 of the TFT array substrate 10, the area between the adjacent pixels in which ITO is not formed are used as the alignment regulating slits.

In this case, a tilted electric field is generated between the pixels electrode 9 and the common electrode 31 to carry out the alignment regulation of liquid crystal molecules. Further, since the intersection angle θ between the vicinity of the boundary between the transmissive display region T and the reflective display region R, that is, the inclined plane 26a, and the slits 34 is set to about 90°, the disorder in alignment hardly occurs. Furthermore, in the pixel electrodes 9 of the TFT array substrate 10, the areas between adjacent pixels are used as the alignment regulating slits. Thus, the slit areas decrease as compared with the first and second exemplary embodiments, so that it is possible to obtain a brighter display.

Exemplary Electronic Apparatus

A concrete example of an electronic apparatus including a liquid crystal display device according the above exemplary embodiments of the present invention is described below.

Figure 8:
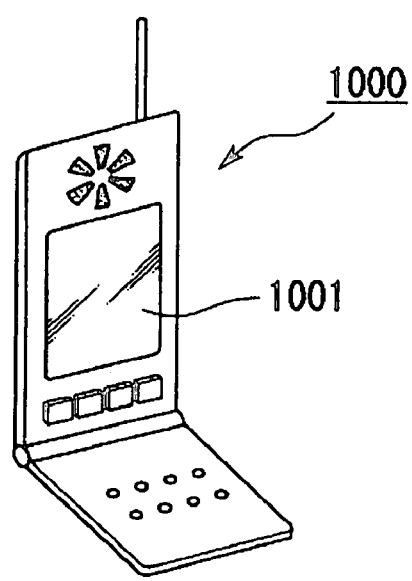
FIG. 8 is a perspective view illustrating an example of an electronic apparatus according to the present invention.

FIG. 8 is a perspective view illustrating an example of a portable telephone. In FIG. 8, reference numeral 1000 denotes a main body of the portable telephone, and reference numeral 1001 denotes a display unit employing the above liquid crystal display device. When the liquid crystal display devices according to the above embodiments are used in the display unit of an electronic apparatus, such as the portable telephone, etc., it is possible to realize an electronic apparatus including a liquid crystal display unit, which has a high brightness regardless of the operating environment thereof, has a high contrast in both the transmissive display and the reflective display, and has a wide viewing angle.

Moreover, a technical scope of the present invention is not limited to the aforementioned exemplary embodiments, and modifications and changes may be made thereto without departing from the intention of the present invention. For example, although the present invention is applied above to an active matrix liquid crystal display device employing TFTs functioning as switching elements as in the aforementioned exemplary embodiments, the present invention may be applied to an active matrix liquid crystal display device employing thin film diodes (TFDs) functioning as the switching elements, a passive matrix type liquid crystal display device, etc., for example. On the other hand, the specific descriptions of materials, measures, shapes, etc., of various elements may be properly modified and changed, for example.

What is claimed is:

1. A liquid crystal display, comprising:
   a pair of substrates;
   a liquid crystal layer interposed between the pair of substrates, the liquid crystal layer being formed of liquid crystal with a negative dielectric anisotropy;
   band-shaped reflectors defining band-shaped reflective display regions for reflective display, each band-shaped reflector spanning linearly and continuously across a plurality of independently-controlled dot regions, pairs of band-shaped reflectors extending along opposite sides of each dot, a transmissive display region for transmissive display being located between each pair of band-shaped reflectors; and
   electrodes to drive the liquid crystal being formed at a liquid crystal layer side of at least one of the substrates, the electrodes being provided with, as alignment regulators that regulate alignment of the liquid crystal, at least one of a slit-shaped opening formed by making a longitudinal opening in part of the electrode or a longitudinal convex portion made of a dielectric substance formed on the one electrode;
   the liquid crystal layer including a thickness-adjusting layer to allow the thickness of the liquid crystal layer in the transmissive display region to be larger than the thickness of the liquid crystal layer in the reflective display region, the thickness-adjusting layer being formed between at least one of the pair of substrates and the liquid crystal layer, the thickness-adjusting layer having an inclined plane in a vicinity of a boundary between the transmissive display region and the reflective display region so that the layer thickness thereof varies continuously in a slope direction, the thickness-adjusting layer extending linearly and continuously across a plurality of the independently-controlled dot regions in a longitudinal direction substantially orthogonal to the slope direction; and the longitudinal direction of the at least one of the opening or the convex portion intersecting the longitudinal direction of the thickness-adjusting layer as viewed in plan view, wherein in plan view a longitudinal side of the at least one of the opening or the convex portion forms an acute angle with a top edge of the inclined plane and an opposite longitudinal side of the at least one of the opening or the convex portion forms an obtuse angle with the top edge of the inclined plane, or the longitudinal side of the at least one of the opening or the convex portion forms an acute angle with a bottom edge of the inclined plane and the opposite longitudinal side of the at least one of the opening or the convex portion forms an obtuse angle with the bottom edge of the inclined plane.

2. The liquid crystal display device according to claim 1, the longitudinal direction of the at least one of the opening and the convex portion intersecting the longitudinal direction of the thickness-adjusting layer so as to form an angle of 30° to 90° as viewed in plan view from a normal direction of the substrate.

3. The liquid crystal display device according to claim 1, the inclined plane and a plane of one of the substrates forming an angle of 2° to 30°.

4. The liquid crystal display device according to claim 1, the pair of substrates including an upper substrate and a lower substrate, a backlight for transmissive display being provided on the lower substrate opposite to the liquid crystal layer side, and a reflective film selectively formed in the reflective display region being interposed between the lower substrate and the liquid crystal layer.

5. The liquid crystal display device according to claim 1, the at least one of the opening or the convex portion having a construction to regulate a falling-down direction of vertically aligned liquid crystal molecules in accordance with a variation in an electric field.

6. An electronic apparatus, comprising:
the liquid crystal display device according to claim 1.

7. The liquid crystal display according to claim 1, wherein the at least one of the opening or the convex portion has a substantially chevron shape as viewed in plan.

8. The liquid crystal display according to claim 1, wherein slit-shaped openings are provided at both substrates as alignment regulators.

* * * * *